(12) United States Patent  
Lepiorz et al.

(10) Patent No.: US 12,334,524 B2  
(45) Date of Patent: Jun. 17, 2025

(54) SAFETY MECHANISM FOR RECHARGEABLE BATTERY PACK WITH POUCH CELLS

(71) Applicant: Hilti Aktiengesellschaft, Schaan (LI)

(72) Inventors: Matthias Lepiorz, Chemnitz (DE); Moses Ender, Buchs (CH); Robert Stanger, Kaufbeuren (DE)

(73) Assignee: Hilti Aktiengesellschaft, Schaan (LI)

( * ) Notice: Subject to any disclaimer, the term of this patent is extended or adjusted under 35 U.S.C. 154(b) by 356 days.

(21) Appl. No.: 17/058,596

(22) PCT Filed: Jun. 19, 2019

(86) PCT No.: PCT/EP2019/066114  
§ 371 (c)(1),  
(2) Date: Nov. 24, 2020

(87) PCT Pub. No.: WO2020/002062  
PCT Pub. Date: Jan. 2, 2020

(65) Prior Publication Data  
US 2021/0143517 A1 May 13, 2021

(30) Foreign Application Priority Data  
Jun. 26, 2018 (EP) .................................... 18179766

(51) Int. Cl.  
*H01M 10/617* (2014.01)  
*B25F 5/00* (2006.01)  
(Continued)

(52) U.S. Cl.  
CPC ............. *H01M 10/617* (2015.04); *B25F 5/00* (2013.01); *H01M 10/482* (2013.01); *H01M 10/488* (2013.01); *H01M 10/6235* (2015.04); *H01M 10/647* (2015.04); *H01M 10/6555* (2015.04); *H01M 50/202* (2021.01);  
(Continued)

(58) Field of Classification Search  
None  
See application file for complete search history.

(56) References Cited

U.S. PATENT DOCUMENTS

| 7,511,456 B2 | 3/2009 | Lee et al. |
| 2006/0267545 A1* | 11/2006 | Lee .................... H01M 10/613 320/106 |

(Continued)

FOREIGN PATENT DOCUMENTS

| CN | 101 164 179 A | 4/2008 |
| CN | 101872788 A | 10/2010 |

(Continued)

OTHER PUBLICATIONS

English Language Machine Translation of JP2018088944A retrieved from Espacenet (Year: 2018).*

(Continued)

*Primary Examiner* — Scott J. Chmielecki  
(74) *Attorney, Agent, or Firm* — Davidson Kappel LLC

(57) ABSTRACT

A rechargeable battery pack having at least one pouch cell, wherein the rechargeable battery pack has at least one  
(Continued)

electrically conductive filament which surrounds the pouch cell at least in sections in such a way that expansion of the pouch cell causes severing of the filament.

25 Claims, 8 Drawing Sheets

(51) Int. Cl.
  *H01M 10/48*      (2006.01)
  *H01M 10/6235*    (2014.01)
  *H01M 10/647*     (2014.01)
  *H01M 10/6555*    (2014.01)
  *H01M 50/202*     (2021.01)
  *H01M 50/211*     (2021.01)
  *H01M 50/242*     (2021.01)
  *H01M 50/244*     (2021.01)
  *H01M 50/247*     (2021.01)
  *H01M 50/583*     (2021.01)

(52) U.S. Cl.
  CPC ....... *H01M 50/211* (2021.01); *H01M 50/242* (2021.01); *H01M 50/244* (2021.01); *H01M 50/247* (2021.01); *H01M 50/583* (2021.01); *H01M 2200/103* (2013.01); *H01M 2220/30* (2013.01)

(56) References Cited

U.S. PATENT DOCUMENTS

| | | | |
|---|---|---|---|
| 2008/0193838 A1* | 8/2008 | Oh | H01M 10/647 429/175 |
| 2010/0270593 A1 | 10/2010 | Lung et al. | |
| 2014/0060655 A1 | 6/2014 | Bouziane et al. | |
| 2016/0064780 A1* | 3/2016 | Jarvis | H01M 10/4257 429/61 |
| 2017/0331083 A1* | 11/2017 | Koenig | H01M 50/267 |
| 2018/0053970 A1* | 2/2018 | Maeda | H01M 10/482 |
| 2018/0159183 A1 | 6/2018 | Jarvis et al. | |
| 2019/0135111 A1* | 5/2019 | Poirier | B60L 3/0007 |

FOREIGN PATENT DOCUMENTS

| | | | | |
|---|---|---|---|---|
| EP | 2960966 A1 | 12/2015 | | |
| JP | 2018088944 A | * | 6/2018 | ............ A61N 7/00 |
| KR | 20160120053 A | | 10/2016 | |
| KR | 101836516 B1 | * | 3/2018 | ............ H01M 10/46 |

OTHER PUBLICATIONS

English Language Machine Translation of KR101836516B1 retrieved from Espacenet (Year: 2018).*
International Search Report of PCT/EP2019/066114, dated Sep. 23, 2019.

* cited by examiner

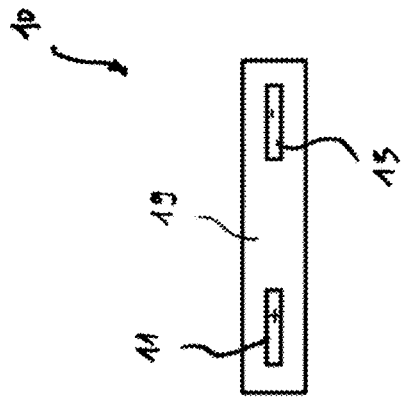
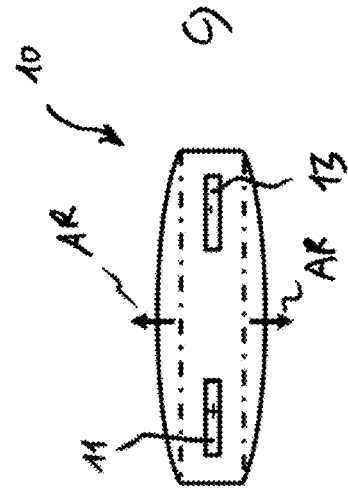
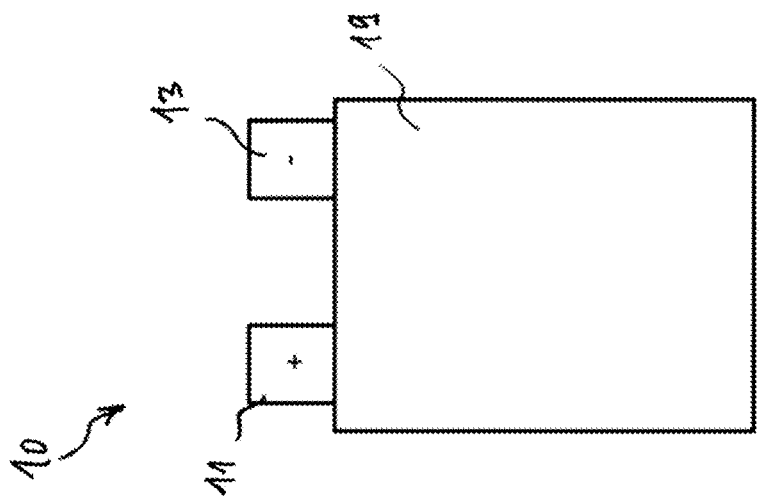
- Prior art -

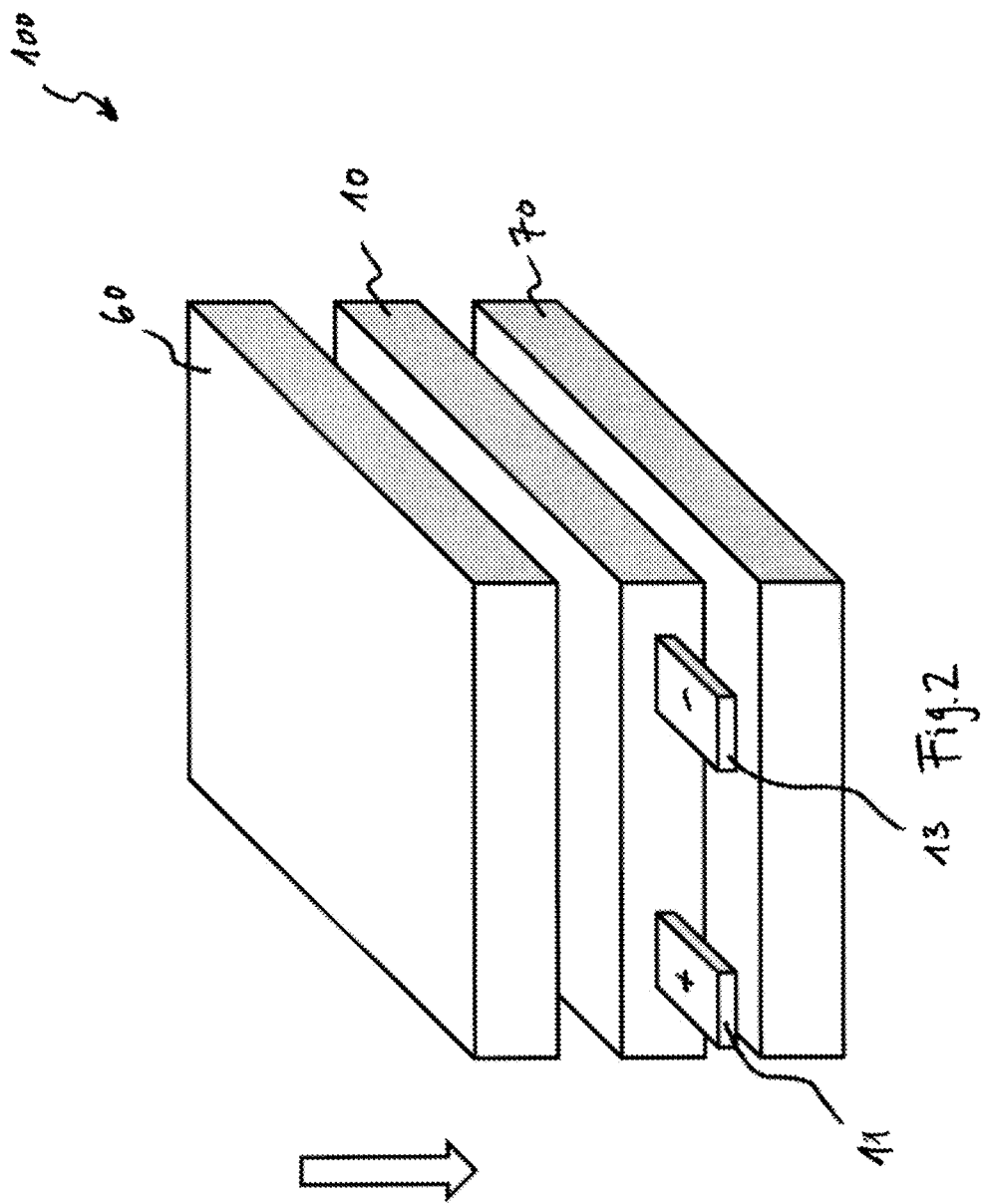

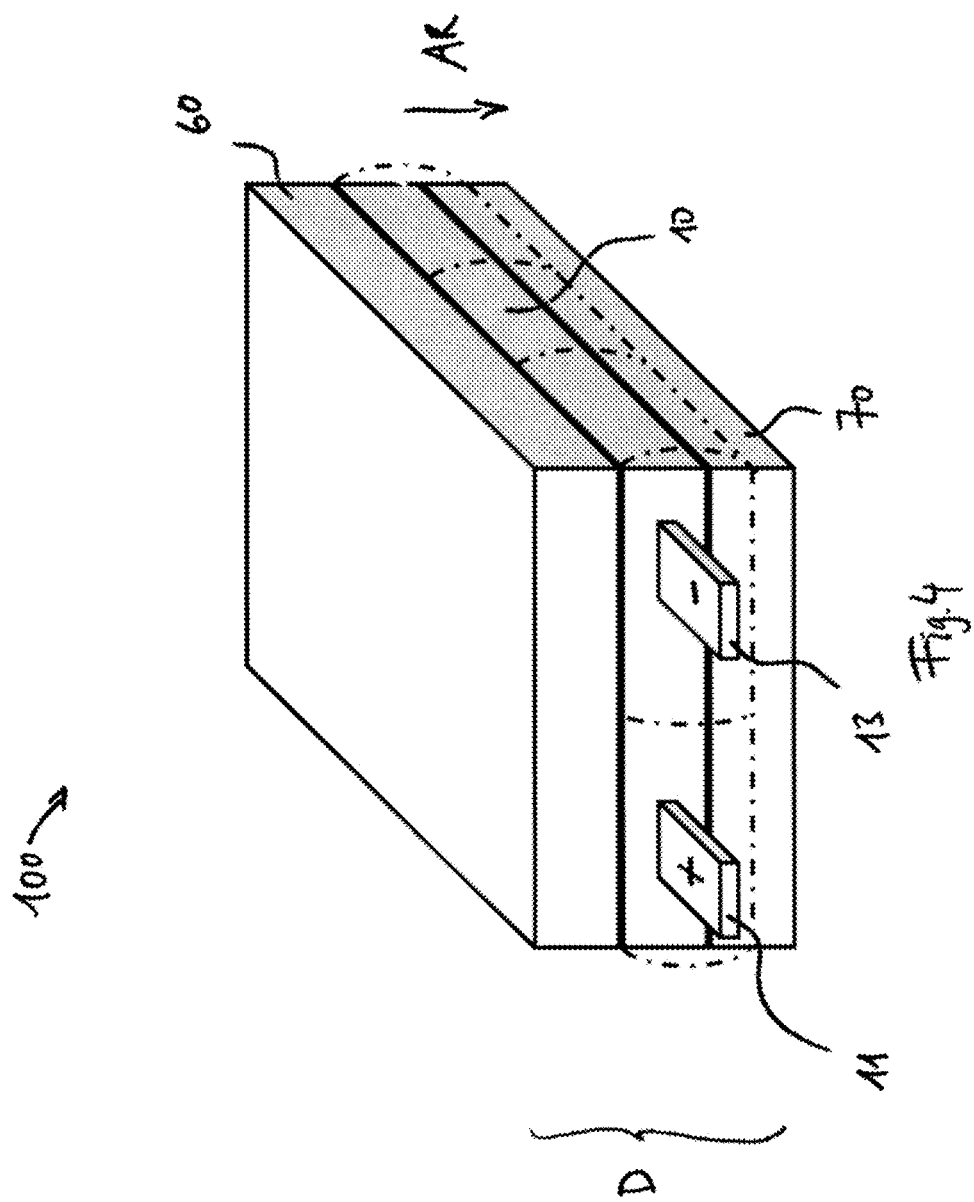

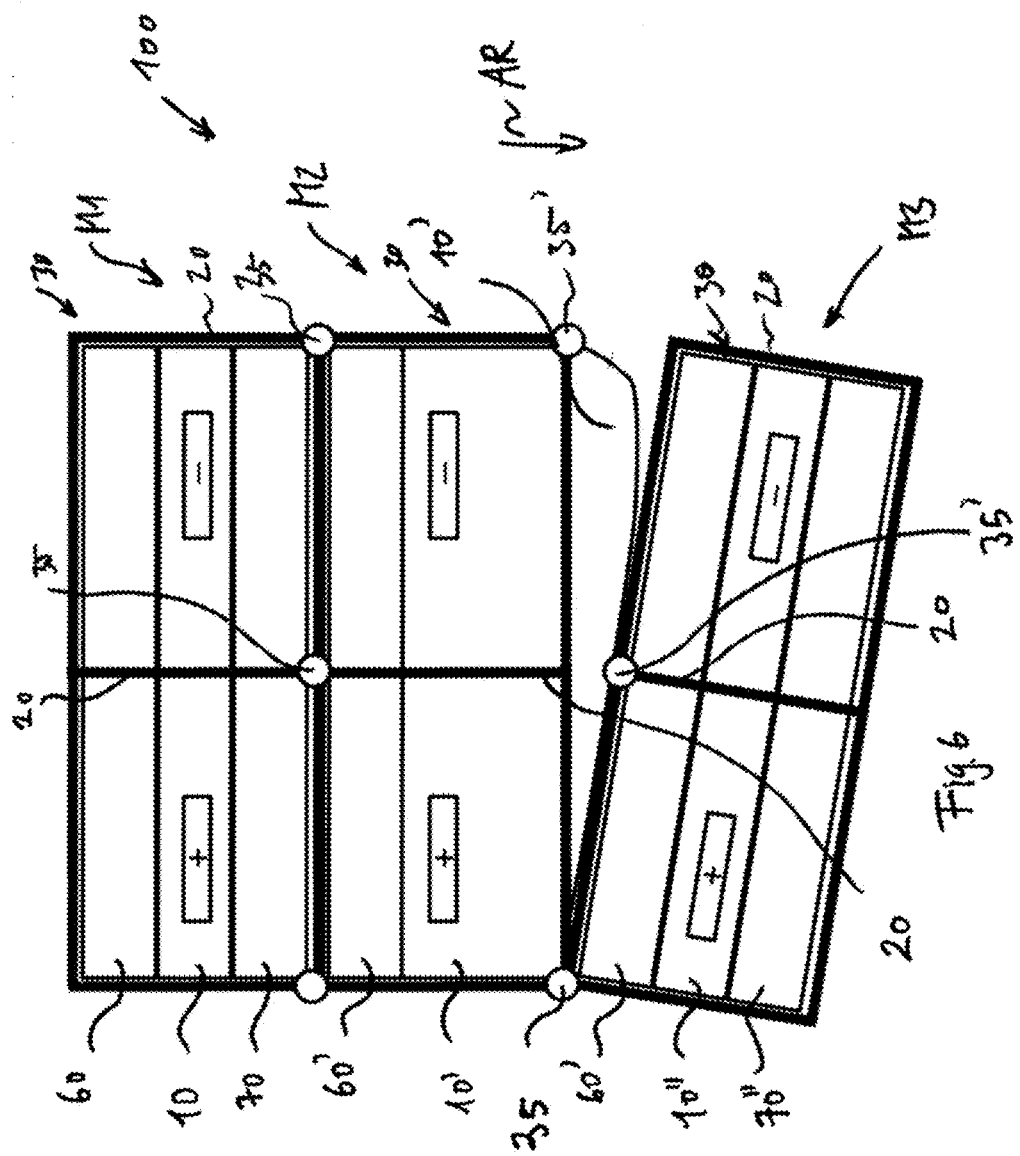

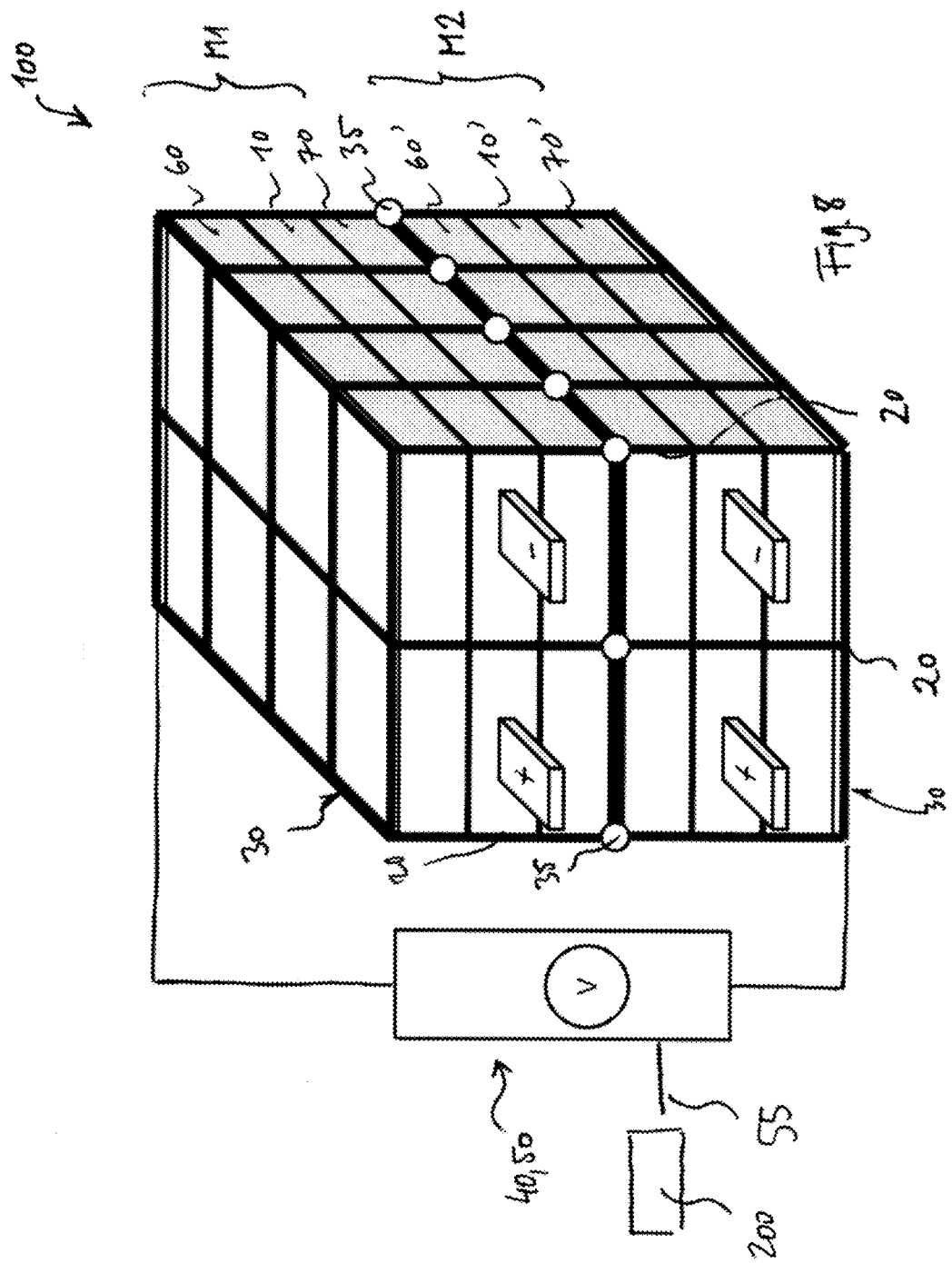

SAFETY MECHANISM FOR RECHARGEABLE BATTERY PACK WITH POUCH CELLS

The present invention relates to a rechargeable battery pack having at least one pouch cell.

BACKGROUND

Rechargeable battery packs and pouch cells are known in principle from the prior art. The phenomenon of what is known as swelling, also referred to as expansion, is likewise known from the prior art. This is problematic since it can lead to an outer cover of the pouch cell bursting open.

SUMMARY OF THE INVENTION

It is an object of the present invention to provide a rechargeable battery pack that provides the basis for increased operational safety.

The present invention provides that the rechargeable battery pack has at least one electrically conductive filament which surrounds or delimits the pouch cell at least in sections in such a way that expansion of the pouch cell causes severing of the filament.

The filament provided according to the invention creates the basis for an effective detection or monitoring system by means of which swelling of one or more pouch cells in a rechargeable battery pack can be determined.

In a particularly preferred refinement, the filament is part of a frame which surrounds the pouch cell, preferably in a cage-like manner. The frame can be of rigid design in order to at least temporarily counter expansion of the pouch cell. The frame can itself consist of plastic or contain a plastic. The frame preferably has one or more electrically conductive filaments.

In a particularly preferred refinement, the rechargeable battery pack has an associated sensor circuit by means of which the severing of the filament can be detected. The sensor circuit is preferably included in the rechargeable battery pack. As an alternative or in addition, a sensor circuit of this kind can be provided, for example, in an electric handheld power tool. In this case, the rechargeable battery pack has at least one electrical and/or signal-transmitting connection between the electrically conductive filament and the electric handheld power tool.

The sensor circuit can be designed, for example, as an interrupter circuit. This can be realized, for example, by a voltage sensor which is connected in series to the electrical filament. If the filament is severed due to the expansion of the pouch cell, a current flow comes to a stop, and a voltage which is dropped across the voltage sensor becomes zero. As an alternative or in addition, severing of the filament can take place, for example, by measuring a current flow through the filament or the filaments.

It has proven to be advantageous if the rechargeable battery pack has an associated control circuit which, when the sensor circuit has detected the severing of the filament, interrupts or reduces drawing of current from the rechargeable battery pack or the pouch cell. The control circuit is preferably included in the rechargeable battery pack. As an alternative or in addition, a control circuit can be included in a handheld power tool.

In a particularly preferred refinement, the control circuit is designed to interrupt or reduce a charging current when the sensor circuit has detected the severing of the filament.

In this way, undamaged pouch cells remaining in the rechargeable battery pack can advantageously be protected.

In a further preferred refinement, the rechargeable battery pack has an associated signal element, for example in the form of an LED, which, when the sensor circuit has detected the severing of the filament, signals damage to the pouch cell. The signal element is preferably included in the rechargeable battery pack. As an alternative or in addition, the signal element can be included in an electric handheld power tool which is supplied with power by the rechargeable battery pack. In this way, failure of one or more pouch cells of the rechargeable battery pack can advantageously be indicated to a user. On the basis of this information, replacement of the rechargeable battery pack in good time can advantageously be considered.

It has proven to be advantageous when the pouch cell has a positive contact and a negative contact, via which contacts the pouch cell can be electrically contacted and thereby charged and discharged. The filament and/or the frame are/is preferably DC-isolated from the positive contact and/or DC-isolated from the negative contact.

The pouch cell can have at least one rechargeable lithium-ion battery or consist of at least one rechargeable lithium-ion battery. The pouch cell is preferably of flat design. The pouch cell can have a flat cell surface which extends parallel in relation to the positive contact and negative contact. The positive contact is advantageously designed as a positive contact lug and/or the negative contact is advantageously designed as a negative contact lug. It has proven to be advantageous when the contact lugs project in the lateral direction from the pouch cell.

In a particularly preferred refinement, the filament and/or the frame have/has at least one predetermined breaking point. The predetermined breaking point can be configured in the form of a low-resistance fuse. Severing of the filament and/or of the frame at the predetermined breaking point, which is caused by the undesired swelling of the pouch cell, can be detected by the above-described sensor circuit.

The rechargeable battery pack preferably has a plurality of pouch cells which are stacked. The frame preferably has at least one predetermined breaking point between two adjacent pouch cells.

In a particularly preferred refinement, the rechargeable battery pack has a heat-conducting plate, preferably a metal heat-conducting plate. In this way, heat which is produced in the pouch cell can be uniformly dissipated. It has likewise proven to be advantageous when the rechargeable battery pack has a volume-compensation plate comprising a pliable volume compensation material. Given constant outside dimensions of the rechargeable battery pack or a rechargeable battery pack cell, the volume-compensation plate can compensate for swelling (volume expansion of the pouch cell) or else at least partially compensate for said swelling. The pouch cell is particularly preferably sandwiched between the heat-conducting plate and the volume-compensation plate.

It has proven to be advantageous when a stack comprising the heat-conducting plate, the pouch cell and the volume-compensation plate is respectively encompassed by a rigid frame which has at least one electrically conductive filament. A heat-conducting plate, a pouch cell and a volume-compensation plate, which are connected in a sandwiched manner and are enclosed by a frame, preferably form a pouch cell module.

In a further preferred refinement, the rechargeable battery pack has a plurality of pouch cells which are each surrounded at least by their own filament and/or by their own frame. A rechargeable battery pack can have a plurality of pouch cell modules.

The invention also provides an electric handheld power tool having a rechargeable battery pack as described above.

BRIEF DESCRIPTION OF THE DRAWINGS

Further advantages can be found in the following description of the figures. Various exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs. In the figures:

FIGS. 1A, 1B and 1C show a pouch cell of the prior art;

FIG. 2 shows a first preferred exemplary embodiment of a rechargeable battery pack according to the invention, illustrated without a filament or frame;

FIG. 4 shows the exemplary embodiment of FIG. 2 with an expanded pouch cell;

FIG. 6 shows a third exemplary embodiment of a rechargeable battery pack according to the invention with a burst-open pouch cell and a broken frame;

FIG. 8 shows a fifth preferred exemplary embodiment of a rechargeable battery pack according to the invention having a sensor circuit and a control circuit.

DETAILED DESCRIPTION

A pouch cell of the prior art is illustrated in FIGS. 1A, 1B and 1C showing a pouch cell 10 having a planar housing 19 of flat design. The pouch cell 10 has a metal positive contact 11 and a metal negative contact 13. The pouch cell 10 can be electrically contacted and thereby charged and discharged via the positive contact 11 and the negative contact 13.

FIG. 1A shows a plan view of the pouch cell 10. FIG. 2B shows the side view of the pouch cell 10 of FIG. 1A. The pouch cell 10 of FIG. 1B is a new pouch cell, that is to say expansion of the pouch cell 10 has not yet started. In contrast to this, FIG. 1C shows an aged, expanded pouch cell. Said pouch cell has expanded on both sides in the expansion direction AR.

Figure 3:
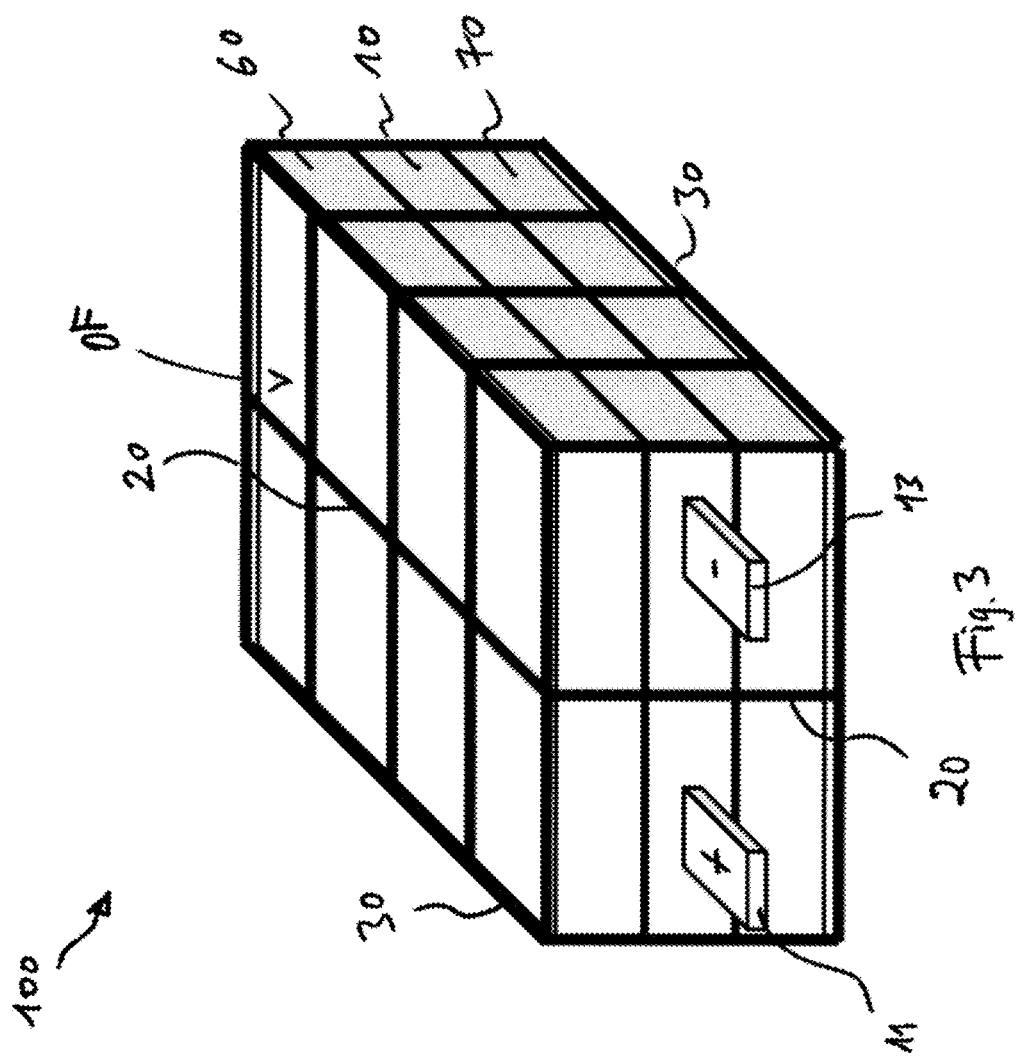
FIG. 3 shows the exemplary embodiment of FIG. 2 accommodated in a frame.

FIG. 2 shows the design of a rechargeable battery pack according to the invention, but in the first instance without the electrically conductive filament 20 provided according to the invention (cf. FIG. 3).

The rechargeable battery pack 100 of FIG. 2 has a pouch cell 10, a metal heat-conducting plate 60 and a volume-compensation plate 70. If the components shown are brought together in the direction of the arrow, a rechargeable battery pack 100 in which the pouch cell 10 is sandwiched between the heat-conducting plate 60 and the volume-compensation plate is produced. This can be seen, for example, in FIG. 3.

In addition to the abovementioned competent pouch cell 10, heat-conducting plate 60 and volume-compensation plate 70, the rechargeable battery pack 100 of FIG. 3 has a frame 30. The frame 30 surrounds the entire sandwich structure comprising the heat-conducting plate 60, the pouch cell 10 and the volume-compensation plate 70. In the present case, the frame 30 is formed from plastic and furthermore is of rigid design in order to counter expansion of the pouch cell 10 (cf. FIG. 4).

The rechargeable battery pack 300 has an electrically conductive filament 20 which surrounds the pouch cell 10 at least in sections. In the exemplary embodiment illustrated in the present case, the filament 20 is part of the frame 30. However, even if the frame 30 itself is not electrically conductive, the filament 20 forms an electrically conductive power line which is severed when the pouch cell 10 expands (cf. FIG. 6).

In the exemplary embodiment of FIG. 3, the electrically conductive filament 20 runs along a surface OF of the rechargeable battery pack 100. Since the rechargeable battery pack 100 as shown in FIG. 3 includes the pouch cell 10, the pouch cell 10 is also surrounded by the electrically conductive filament 20 at least in sections.

FIG. 4 now initially shows an expanded, that is to say aged, pouch cell 10 of stacked design which is already known from FIG. 3 (without the frame 30). As is indicated by the dashed line, the pouch cell 10 expands, that is to say the volume of said pouch cell increases, at the expense of the volume of the pliable volume-compensation plate 70, the thickness of which decreases. In the process, the pouch cell 10 expands in the expansion direction AR. As can be clearly seen in FIG. 4, the thickness D of the stack comprising the heat-conducting plate 60, the pouch cell 10 and the volume-compensation plate 70 remains constant.

Figures 5A, 5B:
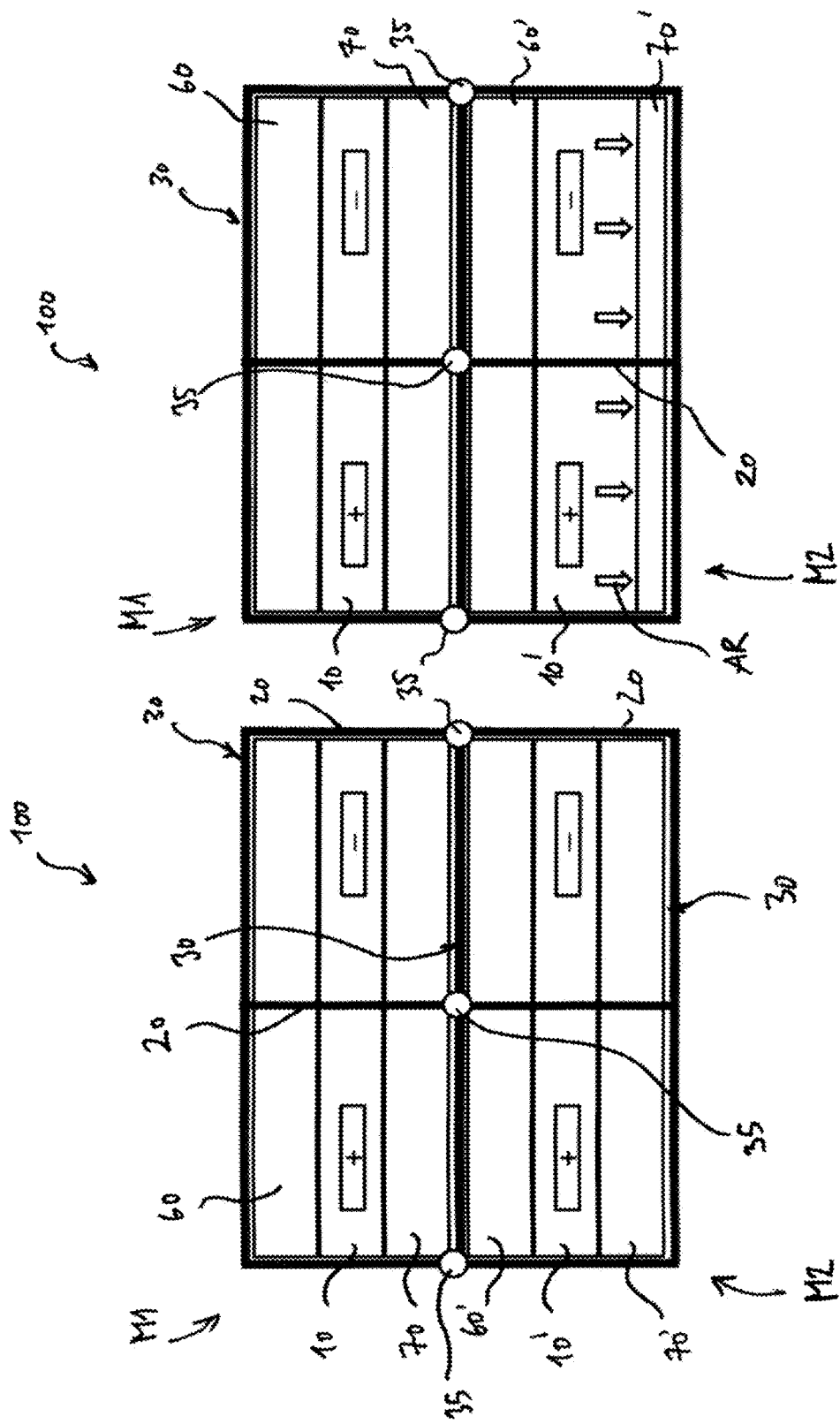
FIGS. 5A and 5B show a second preferred exemplary embodiment of a rechargeable battery pack according to the invention having two pouch cell modules.

FIGS. 5A and 5B show a rechargeable battery pack 100 having two pouch cells 10, 10'. A first module M1 is formed from the first pouch cell 10, the first heat-conducting plate 60 and the first volume-compensation plate 70. A second module M2 is defined by the second pouch cell 10', the second heat-conducting plate 60' and the second volume-compensation plate 70'.

Both the first module M1 and the second module M2 are surrounded by a frame 30 which encompasses the modules M1 and M2 in a rigid manner. A plurality of electrically conductive filaments 20 which each have a predetermined breaking point 35 form part of the frame. The predetermined breaking points 35 are each in the form of a low-resistance fuse.

FIG. 5A shows the rechargeable battery pack 100 in a new state, that is to say the first pouch cell 10 and the second pouch cell 10' are not expanded.

The aged rechargeable battery pack 100 is illustrated in FIG. 5B. It can be clearly seen that the second pouch cell 10' has expanded in the expansion direction AR. In this case, a change in volume of the second pouch cell 10' is at the expense of the second volume-compensation plate 70' which is of pliable design. On account of the frame of rigid design, further expansion of the second pouch cell 10' is initially countered. As can likewise be gathered from FIG. 5B, the predetermined breaking points 35 are intact, that is to say the expansion of the second pouch cell 10' has not yet exceeded a critical amount.

Critical expansion of a pouch cell will now be described with reference to FIG. 6. FIG. 6 shows a rechargeable battery pack 100 with a total of three modules M1, M2, M3. In this case, each of the modules M1, M2 and M3 is surrounded or delimited by its own frame 30. An electrically conductive filament 20 which has in each case one predetermined breaking point 35 at the connection points between the individual modules M1, M2 and M3 is part of each frame 30. In other words, the predetermined breaking points 35 also mark the connection points between adjacent modules M1, M2; M2, M3.

As can be gathered from FIG. 6, the first module M1 and the third module M3 are completely intact, that is to say the first pouch cell 10 and the third pouch cell 10''' are not expanded.

In the case of the middle module, the second module M2, the second pouch cell 10' is aged, that is to say it is significantly expanded in the expansion direction AR. This expansion causes the frame 30 to break open at the predetermined breaking points 35' (in the center and on the right). In other words, a respective filament 20 or the frame 30 of the rechargeable battery pack 100 is severed at these predetermined breaking points 35'. These interruptions can be used for signal-related evaluation, as will be explained in the further course with reference to FIG. 7.

Figure 7:
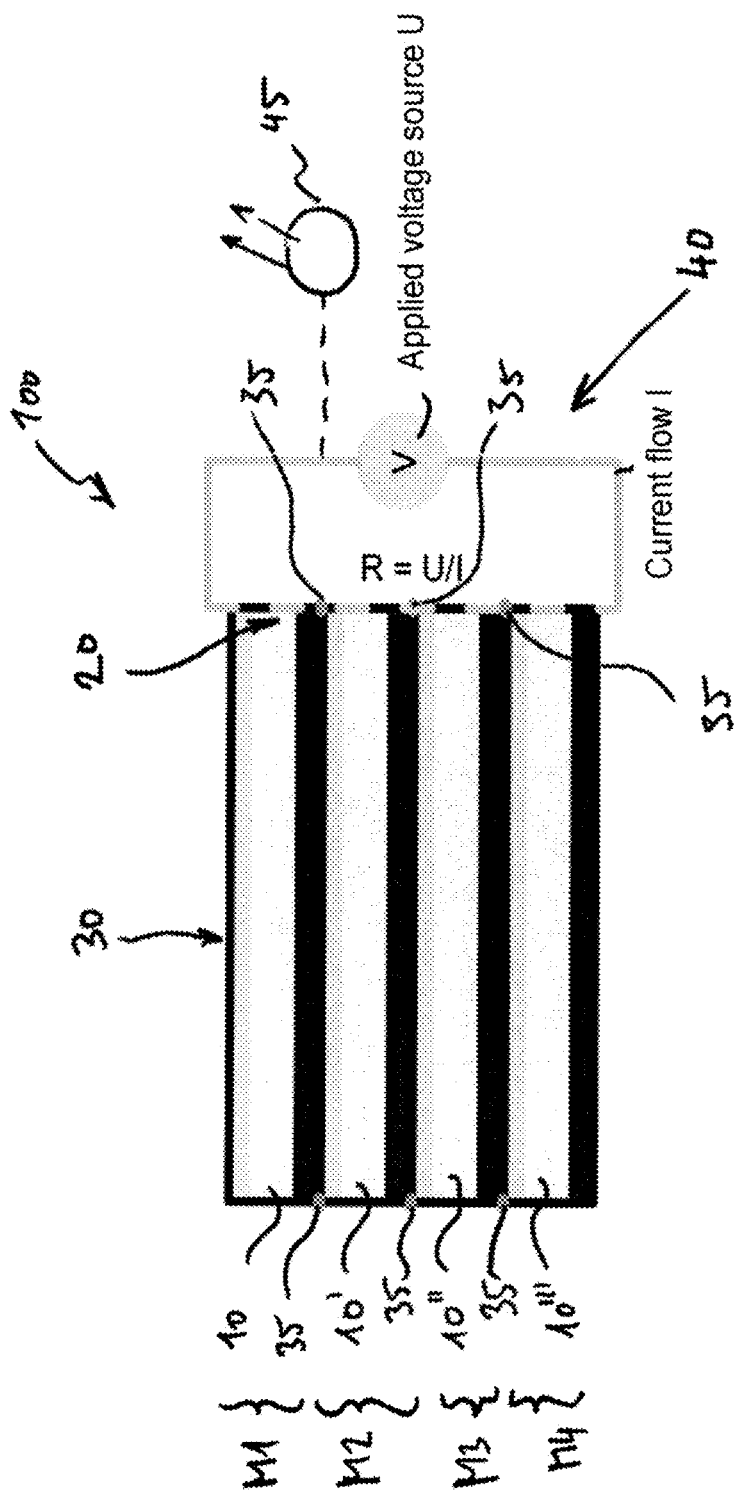
FIG. 7 shows a fourth preferred exemplary embodiment of a rechargeable battery pack according to the invention having a sensor circuit.

FIG. 7 shows a rechargeable battery pack 100 with a total of four modules Ml, M2, M3 and M4 which are enclosed by a rigid frame 30. An electrically conductive filament 20 is illustrated on the right-hand side of the rechargeable battery pack 100 as part of the frame 30. The filament 20 has three predetermined breaking points 35 which are each located at the junctions of adjacent modules.

The filament 20 is connected in series to a sensor circuit 40 which is included in the rechargeable battery pack 100. The sensor circuit 40 has a voltage source U with which voltage is applied to the electrically conductive filament 20. This leads to a current flow I through the electrically conductive filament 20. Any expansion of one of the pouch cells 10 to 10''' would sever the corresponding predetermined breaking point 35 and a current flow I through the sensor circuit 40 would be detected as interrupted.

By way of example, the rechargeable battery pack 100 of FIG. 7 also has a signal element 45 in the form of an LED which is connected in a signal-transmitting manner to the sensor circuit 40. If the sensor circuit 40 detects the severing of the filament 20 at the predetermined breaking point 35, that is if one of the pouch cells 10 to 10''' is damaged, a user can be visually informed of damage of this kind via the signal element 45. In this case, different flashing intervals and/or colors of the LED are possible for example in order to be able to represent or to differentiate between, for example, the damage to one or more pouch cells.

Finally, FIG. 8 shows a further exemplary embodiment of a rechargeable battery pack 100 according to the invention. The rechargeable battery pack 100 in FIG. 8 has a total of two modules M1 and M2, that is substantially corresponds to the exemplary embodiment described with reference to FIG. 5.

The rechargeable battery pack 100 of FIG. 8 has a control circuit 50 in addition to the exemplary sensor circuit 40 already described with reference to FIG. 7. The control circuit 50 is designed to reduce drawing of current from the rechargeable battery pack 100 or a respective pouch cell 10, 10' when the sensor circuit 40 has detected severing of the filament 20 or the frame 30 at the predetermined breaking point 35.

The control circuit 50 can be designed to completely interrupt drawing of current from the rechargeable battery pack 100 or the pouch cell 10. However, it is advantageous to reduce the respective drawing of current, as a result of which the run time of the entire rechargeable battery pack 100 can be comparatively longer.

In the exemplary embodiment illustrated in the present case, the sensor circuit 40 and the control circuit 50 are designed to be integrated with one another. Furthermore, the control circuit 50 is designed to reduce a charging current when the sensor circuit has detected the severing of one or more filaments 20. The request for a reduced charging current from a charger 200 can be made, for example, via a signal connection 55 which connects the control circuit 50 to a charger 200. In other words, a damaged rechargeable battery pack 100, that is to say a rechargeable battery pack 100 with at least one swollen pouch cell (not shown here), can report this state of damage to the charger 200, so that it accordingly charges the rechargeable battery pack 100 with a reduced charging current. As an alternative or in addition, the rechargeable battery pack 100 could also communicate with a handheld power tool, not shown here, via a signal connection 55 in order to transmit, for example, the maximum current which can be called up from the rechargeable battery pack 100.

LIST OF REFERENCE SIGNS

10 . . . 10''' Pouch cell
11 Positive contact
13 Negative contact
19 Housing
20 Filament
30 Frame
35, 35' Predetermined breaking point
40 Sensor circuit
45 Signal element
50 Control circuit
55 Signal connection
60 . . . 60''' Heat-conducting plate
70 . . . 70''' Volume-compensation plate
100 Rechargeable battery pack
200 Charger
AR Expansion direction
D Thickness
I Current flow
OF Surface
M1 . . . M4 Modules
U Voltage source

What is claimed is:

1. A rechargeable battery pack comprising:
at least one pouch cell; and
at least one electrically conductive filament surrounding or delimiting the pouch cell at least in sections in such a way that expansion of the pouch cell causes severing of the filament; wherein the filament or a frame surrounding the pouch cell has at least one predetermined breaking point.

2. The rechargeable battery pack as recited in claim 1 further comprising the frame surrounding the pouch cell, the filament being a part of the frame.

3. The rechargeable battery pack as recited in claim 2, wherein the frame is a cage.

4. The rechargeable battery pack as recited in claim 1, wherein the severing of the filament can be detected by a sensor circuit.

5. The rechargeable battery pack as recited in claim 4 further comprising the sensor circuit.

6. The rechargeable battery pack as recited in claim 4, wherein a control circuit interrupts or reduces drawing of current from the rechargeable battery pack or the pouch cell when the sensor circuit has detected the severing of the filament.

7. The rechargeable battery pack as recited in claim 4 further comprising the control circuit.

8. The rechargeable battery pack as recited in claim 1, wherein the pouch cell has a positive contact and a negative contact, the pouch cell electrically contactable and thereby chargeable and dischargeable via the positive and negative contacts.

9. The rechargeable battery pack as recited in claim 8, wherein the positive and negative contacts are metal.

10. The rechargeable battery pack as recited in claim 8, wherein the pouch cell is surrounded by a frame including plastic.

11. The rechargeable battery pack as recited in claim 1, wherein the at least one predetermined breaking point is a fuse.

12. The rechargeable battery pack as recited in claim 4, wherein a signal element signals damage to the pouch cell when the sensor circuit has detected the severing of the filament.

13. The rechargeable battery pack as recited in claim 12 further comprising the signal element.

14. The rechargeable battery pack as recited in claim 12, wherein the signal element is an LED.

15. The rechargeable battery pack as recited in claim 1 further comprising a heat-conducting plate and a volume-compensation plate sandwiching the pouch cell.

16. The rechargeable battery pack as recited in claim 2, wherein the frame is more rigid than the pouch cell in order to counter expansion of the pouch cell.

17. The rechargeable battery pack as recited in claim 1, wherein the at least one pouch cell includes a plurality of pouch cells each surrounded or delimited at least by at least one of the at least one filament or by a frame.

18. An electric handheld power tool comprising the rechargeable battery pack as recited in claim 1.

19. The rechargeable battery pack as recited in claim 1, wherein the at least one electrically conductive filament includes two filaments, each filament having a predetermined breaking point of the at least one predetermined breaking point.

20. The rechargeable battery pack as recited in claim 19, wherein the two filaments are parallel to each other.

21. The rechargeable battery pack as recited in claim 20, wherein the at least one pouch cell includes a first and a second pouch cell, a first module being formed from the first pouch cell, a first heat-conducting plate and a first volume-compensation plate, and a second module being formed from the second pouch cell, the second heat-conducting plate and the second volume-compensation plate.

22. The rechargeable battery pack as recited in claim 21 further comprising a frame surrounding the first and second pouch cells, the two filaments being a part of the frame.

23. The rechargeable battery pack as recited in claim 22, wherein the first pouch cell has a first positive contact and a first negative contact, and the second pouch cell a second positive contact and a second negative contact, one of the filaments running between the first and second positive contacts and the first and second negative contacts.

24. The rechargeable battery pack as recited in claim 19, wherein the predetermined breaking points are fuses.

25. The rechargeable battery pack as recited in claim 11, wherein the filament is part of the frame.

\* \* \* \* \*